No. 718,270. PATENTED JAN. 13, 1903.
F. W. MOSELEY.
CALF FEEDER.
APPLICATION FILED SEPT. 12, 1902.
NO MODEL.
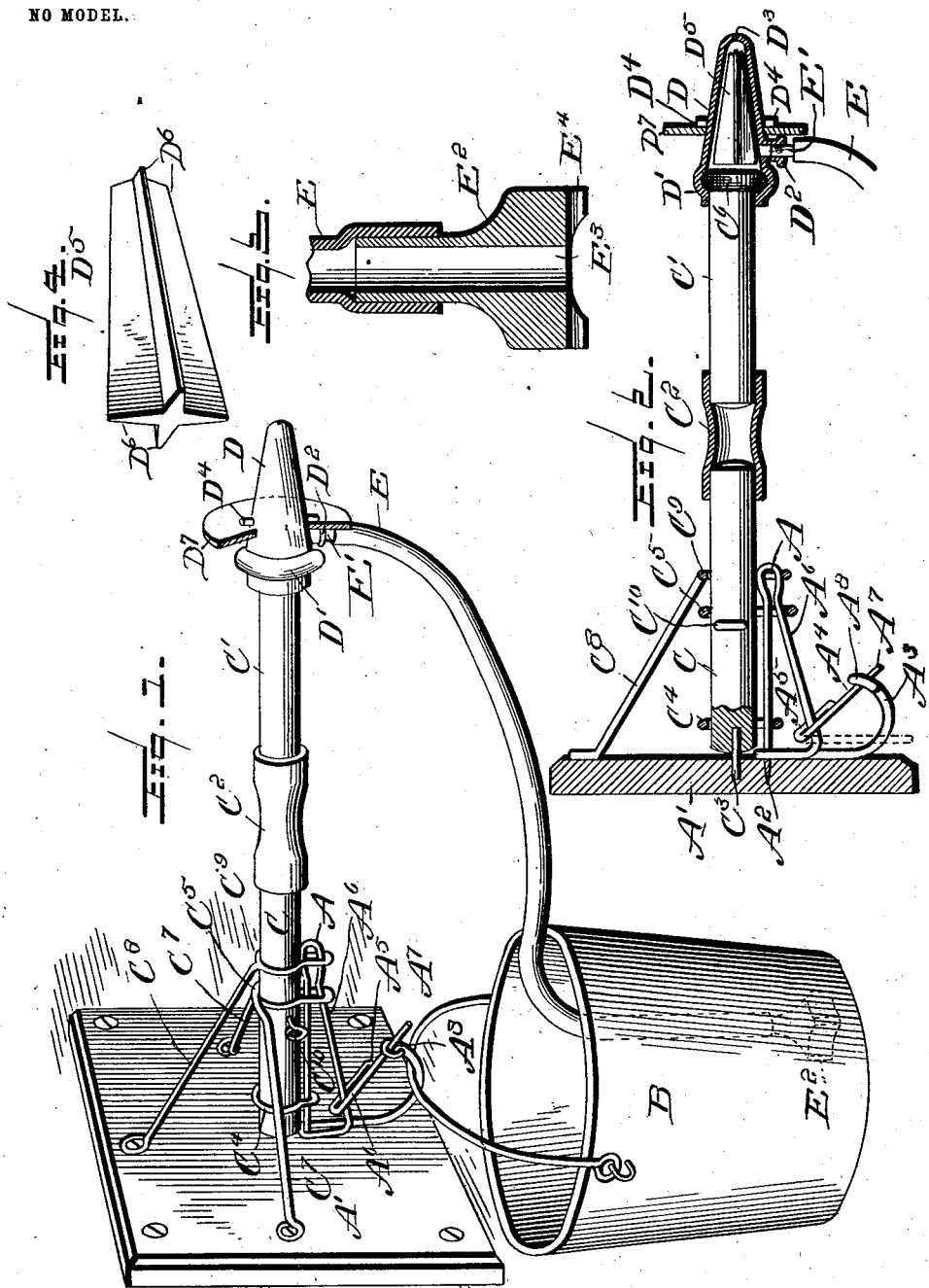
WITNESSES:
Wm F. Doyle.
Alfred I. Gage.
INVENTOR
Fredrick W. Moseley
By E. B. Stockling
Attorney

UNITED STATES PATENT OFFICE.

FREDRICK W. MOSELEY, OF CLINTON, IOWA.

CALF-FEEDER.

SPECIFICATION forming part of Letters Patent No. 718,270, dated January 13, 1903.

Application filed September 12, 1902. Serial No. 123,171. (No model.)

*To all whom it may concern:*

Be it known that I, FREDRICK W. MOSELEY, a citizen of the United States, residing at Clinton, in the county of Clinton, State of Iowa, have invented certain new and useful Improvements in Calf-Feeders, of which the following is a specification, reference being had therein to the accompanying drawings.

This invention relates to a calf-feeder, and particularly to a structure for mounting and supporting the teat and adjacent parts.

The invention has for its object to provide a structure of support which will permit a universal movement of the teat and also hold in a convenient position the receptacle containing the fluid to be fed through the teat by means of a connecting-tube.

A further object of the invention is to provide an improved construction of teat by which the connecting-tube extends directly thereto, and also a stiffening-rib to prevent a complete collapse of the teat by the mouth of the animal.

Other and further objects and advantages of the invention will be hereinafter set forth and the novel features thereof defined by the appended claims.

In the drawings, Figure 1 is a perspective of the invention in position for use; Fig. 2, a side elevation thereof with parts in section; Fig. 3, a vertical section through the sinker, and Fig. 4 a detail perspective of the stiffening-frame for the teat.

Like letters of reference refer to like parts in the several figures of the drawings.

The letter A indicates a supporting-bracket which may be secured to any suitable support—for instance, a backing, such as a board A', adapted to be fixed to a wall—and the bracket is provided with a screw-point $A^2$ or other suitable attaching device for this purpose. At the lower portion of the bracket a hook $A^3$ is formed adapted to receive the bail of a bucket or other suitable receptacle B, adapted to contain the milk or other liquid to be fed. For the purpose of preventing the accidental removal of this bail from the hook a pin $A^4$ is provided, which is formed with an open slot $A^5$ at its upper portion extending over an arm $A^6$ of a bracket, so as to slide thereon and permit the free end $A^7$ of the pin to be passed through an eye $A^8$, formed at the end of the hook $A^3$. By this means the pin may be disengaged from the eye and allowed to fall into the position shown by dotted lines in Fig. 2. Attached to the upper surface of the bracket A is a supporting-arm formed of a fixed section C and a movable section C', connected together by a flexible coupling $C^2$, which may be of any desired character to permit a universal movement of the section C' and in the present instance is illustrated as of a stiffened rubber tube placed over the adjacent ends of the fixed and movable sections of the support, while the inner end of the fixed section is provided with a pin $C^3$, adapted to enter a suitable aperture in the support for the bracket, while the fixed section is secured to the bracket A by means of the loops $C^4$ and $C^5$, rigidly affixed to the bracket A. The outer end of the movable section may be provided with an enlargement $C^6$ to receive the inner end D' of a teat D of any desired construction.

The parts just described may be suitably formed to hold the support for the teat in proper position; but, if desired, additional braces may be provided. For instance, arms $C^7$ may be extended from the backing-board to the loop $C^5$ and secured to said board, while an additional brace $C^8$ may be extended from the board above the bracket A and provided with a loop $C^9$ to surround the fixed support C and the bracket and hold the same against downward movement. The support C is held against longitudinal removal from the loops through which it passes by means of a pin $C^{10}$, extending through the support and projecting sufficiently on either side to engage the loop.

I have shown herein a novel construction of the teat D, which may be mounted in any preferred manner, but is herein shown as formed at one end with an attaching-flange D', adapted to fit over the solid end of section C', which thereby forms a support and closure therefor. The teat is provided adjacent to the flange with a neck $D^2$, extending laterally from a wall thereof and to which the conducting tube or pipe E is secured by any desired means—for instance, a metallic sleeve E', entering both the neck and the end of the tube. The opposite end of the teat is provided with the usual opening $D^3$, through which the liquid is sucked by the calf, and, if desired, projections D⁴ may be provided upon the periphery of the teat adjacent to the neck D² for holding a shield D⁷ in position between the projections and neck to prevent the animal from taking too much of the teat in its mouth or injuring the other parts. For the purpose of preventing a collapse of the teat through pressure of the jaws of the animal a stiffener D⁵ is formed separate from the teat and inserted therein, so as to be capable of removal when it is desired to cleanse the teat. This stiffener, as shown in Fig. 4, is provided with a series of radiating wings D⁶ and is formed, preferably, of rubber of sufficient stiffness to retain its shape under ordinary pressure.

The end of the conducting-pipe E opposite to the teat is provided with a sinker E², having a central aperture E³ communicating with the pipe E and with legs or feet E⁴ to raise the same above the bottom of the bucket or the receptacle in which it is placed.

The operation of the invention will be apparent from the foregoing description, and it should be stated that a calf in using a feeder of this description moves or wiggles its head a great deal and pushes or bunts the teat, so that it is essential in producing a successful device that the teat should be mounted upon its support by a flexible connection which will permit a universal movement thereof. It will furthermore be noted that by conveying the liquid feed directly to the teat less suction is required by the animal in order to secure its food owing to the direct feeding into the teat and requires only the cleansing of a single part after the feeding. The structure of bracket disclosed permits the convenient mounting of the support carrying the teat and also of the bucket carrying the feed, which support and bracket are independent of the backing-board or support and can be quickly attached in any position desired and ready for use in the most convenient manner. It will also be noted that the structure produced is simple and light in weight, so as to render the same easily transportable through the mails and to be produced and sold at a very reasonable cost.

It will be obvious that changes may be made in the details of construction and configuration without departing from the spirit of the invention as defined by the appended claims.

Having described my invention and set forth its merits, what I claim, and desire to secure by Letters Patent, is—

1. In a calf-feeder, a support, a teat-carrying arm projecting therefrom, and a connection between said support and teat-arm to permit a universal movement of the latter; substantially as specified.

2. In a calf-feeder, a support, a teat-carrying arm projecting therefrom, a connection between said support and teat-arm to permit a universal movement of the latter, an inlet-neck upon said teat, and a conducting-tube extending from said neck; substantially as specified.

3. In a calf-feeder, a support, a teat, a connection between said support and teat to permit a universal movement of the latter, an inlet-neck upon said teat, a conducting-tube extending from said neck, a protecting-shield upon said teat, a bracket for said support provided with a hook to support a receptacle, and a locking-pin for securing the bail of said receptacle upon said hook; substantially as specified.

4. In a calf-feeder, a support, a teat, a connection between said support and teat to permit a universal movement of the latter, an inlet-neck upon said teat, a conducting-tube extending from said neck, a bracket for said support provided with a hook to support a receptacle, a locking-pin for securing the bail of said receptacle upon said hook, and an independent stiffener provided with flexible radiating wings and inserted in said teat; substantially as specified.

5. In a calf-feeder, a supporting-bracket, a fixed support mounted thereon, a movable support, a flexible universal connection between said fixed and movable supports, and a teat carried by the free end of said movable support; substantially as specified.

6. In a calf-feeder, a supporting-bracket, a fixed support mounted thereon, a movable support, a flexible universal connection between said fixed and movable supports, a teat carried by the free end of said movable support, a backing upon which said bracket is mounted, a pin carried by said fixed support to enter said backing, and means to engage the bracket for preventing the longitudinal movement of said fixed support; substantially as specified.

7. In a calf-feeder, a supporting-bracket, a fixed support mounted thereon, a movable support, a flexible connection between said fixed and movable supports, a teat carried by the free end of said movable support, a backing upon which said bracket is mounted, a pin carried by said fixed support to enter said backing, means to engage the bracket for preventing the longitudinal movement of said fixed support, a conducting-neck extending from one wall of said teat, and a conducting-pipe provided with a sinker at its free end extending from said neck to a receptacle; substantially as specified.

8. In a calf-feeder, a supporting-bracket having a loop upon its upper face, a fixed support mounted thereon, a movable support, a flexible universal connection between said fixed and movable supports, a teat carried by the free end of said movable support, a backing upon which said bracket is mounted, a pin carried by said fixed support to enter said backing, and a pin extended to engage the bracket-loops for preventing the longitudinal movement of said fixed support; substantially as specified.

9. In a calf-feeder, a supporting-bracket, a fixed support mounted thereon, a movable support, a flexible connection between said fixed and movable supports, a teat carried by the free end of said movable support, a backing upon which said bracket is mounted, a pin carried by said fixed support to enter said backing, and braces extended from said backing to said bracket and surrounding said fixed support; substantially as specified.

10. In a calf-feeder, a teat provided with a connecting-neck upon one wall thereof, and a flange at one end for securing the teat to a support; substantially as specified.

11. In a calf-feeder, a teat provided with a connecting-neck upon one wall thereof, an open end for securing the teat to a support, and a stiffener for said teat comprising a body having radiating wings of elastic material adapted to be inserted therein; substantially as specified.

12. In a calf-feeder, a teat and feeding connections therewith, a support for said teat comprising stationary and movable members, and a flexible tubular connection for universal movement between said members; substantially as specified.

13. In a calf-feeder, a supporting-bracket for a teat provided with a hook having an eye at its free end, and a pin mounted upon said bracket by a looped portion embracing an arm thereof and adapted at its free end to pass through said eye; substantially as specified.

14. In a calf-feeder, the combination with a supporting-arm, of a teat mounted thereon and closed at its rear end, and a connecting-neck extending laterally from one wall thereof; substantially as specified.

In testimony whereof I affix my signature in presence of two witnesses.

FREDRICK W. MOSELEY.

Witnesses:
M. ANGELL,
C. A. MOSELEY.